United States Patent
Johnson et al.

(10) Patent No.: US 10,207,878 B1
(45) Date of Patent: Feb. 19, 2019

(54) PNEUMATIC CONVEYING SYSTEM UTILIZING A PRESSURED HOPPER WITH INTERMITTENT VOLUMETRIC FEED CONTROL

(71) Applicant: Nol-Tec Systems, Inc., Lino Lakes, MN (US)

(72) Inventors: Erik W Johnson, Mendota Heights, MN (US); Michael G. Thiel, Minneapolis, MN (US); Mitchell J. Lund, St. Paul, MN (US)

(73) Assignee: Nol-Tec Systems, Inc., Lino Lakes, MN (US)

( * ) Notice: Subject to any disclaimer, the term of this patent is extended or adjusted under 35 U.S.C. 154(b) by 0 days.

(21) Appl. No.: 15/475,549

(22) Filed: Mar. 31, 2017

Related U.S. Application Data (60) Provisional application No. 62/316,509, filed on Mar. 31, 2016.

(51) Int. Cl.
*B65G 53/66* (2006.01)

(52) U.S. Cl.
CPC .................................. *B65G 53/66* (2013.01)

(58) Field of Classification Search
CPC ....... B65G 53/66; B65G 53/08; B65D 88/548
USPC ..................................................... 406/10–33
See application file for complete search history.

(56) References Cited

U.S. PATENT DOCUMENTS

| | | |
|---|---|---|
| 2,919,159 A | 12/1959 | Lacroix |
| 3,190,509 A | 6/1965 | Kirchhoefer |
| 3,515,672 A | 6/1970 | Reinish |
| 3,884,453 A | 5/1975 | Pearce et al. |
| 3,938,848 A | 2/1976 | Krambrock |
| 4,060,183 A | 11/1977 | Puurunen |

(Continued)

FOREIGN PATENT DOCUMENTS

| | | |
|---|---|---|
| FR | 1316052 A | 12/1963 |
| WO | 2014134298 A1 | 9/2014 |

(Continued)

OTHER PUBLICATIONS

Nol-Tec Systems, Inc., USPTO Office Action, U.S. Appl. No. 14/770,933, dated Apr. 20, 2017 (31 pages).

(Continued)

*Primary Examiner* — William R Harp
(74) *Attorney, Agent, or Firm* — Dierdre M Kvale; DMK Intellectual Property Law (57) ABSTRACT

A control assembly for continuously dispensing material from a pressurizable hopper utilizing multiple control schemes. The multiple control schemes include a first phase for dispensing material from a pressurized hopper using a loss-in-weight feed control scheme and a second phase for dispensing material from a vented hopper using a volumetric feed rate control scheme. During the first phase a pressure valve coupled to the hopper is opened to pressurize the hopper and a fill valve and vent valve are closed. The controller receives feedback from one or more load cells to control a mass flow rate of material dispensed from the feed device during the first phase. During the second phase, the pressure valve is closed and the fill and vent valves are opened. The controller uses input from a feed rate or speed sensor to control a feed rate or speed of the feed device during the second phase.

20 Claims, 6 Drawing Sheets

(56) References Cited

U.S. PATENT DOCUMENTS

| | | | |
|---|---|---|---|
| 4,136,857 A | 1/1979 | Kolb | |
| 4,205,931 A | 6/1980 | Singer | |
| 4,341,107 A | 7/1982 | Blair | |
| 4,427,135 A | 1/1984 | MacKay | |
| 4,488,837 A | 12/1984 | Mizokawa | |
| 4,490,077 A | 12/1984 | Shimada | |
| 4,528,848 A * | 7/1985 | Hafner | G01F 11/24 110/101 CC |
| 4,582,454 A * | 4/1986 | Brandenburg | C21B 5/003 110/104 R |
| 4,850,703 A | 7/1989 | Hanaoka | |
| 4,883,390 A * | 11/1989 | Reintjes | B65G 53/12 406/124 |
| 5,240,324 A | 8/1993 | Phillips | |
| 5,365,950 A | 11/1994 | Yoshimoto | |
| 5,576,499 A | 11/1996 | Davies | |
| 5,670,751 A | 9/1997 | Hafner | |
| 5,738,249 A | 4/1998 | Kikuchi et al. | |
| 5,775,852 A | 7/1998 | Boutte et al. | |
| 6,500,238 B1 | 12/2002 | Brandes et al. | |
| 6,979,116 B2 | 12/2005 | Cecala et al. | |
| 2006/0056924 A1 | 3/2006 | Jurkovich | |
| 2007/0014185 A1 | 1/2007 | Diosse | |
| 2008/0124179 A1 | 5/2008 | Fleckten | |
| 2008/0191153 A1 | 8/2008 | Marganski et al. | |
| 2009/0304461 A1 | 12/2009 | Strohschein | |
| 2010/0193077 A1 | 8/2010 | Nelson | |
| 2012/0192711 A1 | 2/2012 | Henningsen et al. | |
| 2013/0139683 A1 | 6/2013 | Hanson et al. | |
| 2016/0009488 A1 | 1/2016 | Hudalla et al. | |
| 2016/0016729 A1 | 1/2016 | Hudalla et al. | |
| 2016/0202110 A1 | 7/2016 | Johnson et al. | |
| 2017/0210574 A1 * | 7/2017 | Ellis | B65G 53/66 |

FOREIGN PATENT DOCUMENTS

| | | | |
|---|---|---|---|
| WO | 2014134327 A1 | 9/2014 | |
| WO | WO-2014134298 A1 * | 9/2014 | B01D 53/10 |
| WO | WO-2014134327 A1 * | 9/2014 | B01D 53/10 |
| WO | 2015027099 A1 | 2/2015 | |
| WO | WO-2015027099 A1 * | 2/2015 | G01F 1/76 |

OTHER PUBLICATIONS

Vanderwerff, Dry Bulk Sorbent Injection Systems, Nol-Tec Systems, 2009 (2 pages).

FLSmidth Inc, "Reagent Injection Technology", FLSmidth Inc. Jun. 2008 (2 pages).

FLSmidth Inc, "Reagent Handling Systems for the Power Industry", FLSmidth, Mar. 2006 (6 pages).

Nol-Tec Systems, Inc., PCT Written Opinion, PCT/US2014/052160, USPTO dated Dec. 17, 2014 (4 pages).

Nol-Tec Systems, Inc., USPTO Final Office Action, U.S. Appl. No. 14/770,933, dated Oct. 26, 2017 (12 pages).

Nol-Tec Systems, Inc. USPTO Office Action, U.S. Appl. No. 14/913,290, dated Sep. 28, 2017 (8 pages).

USPTO Office Action, U.S. Appl. No. 14/913,290, dated Jan 25, 2018 (8 pages).

USPTO Office Action, U.S. Appl. No. 14/771,027, dated Jan. 26, 2018 (12 pages).

* cited by examiner

PNEUMATIC CONVEYING SYSTEM UTILIZING A PRESSURED HOPPER WITH INTERMITTENT VOLUMETRIC FEED CONTROL

CROSS REFERENCE TO RELATED APPLICATIONS

The present application claims priority to U.S. Provisional Application Ser. No. 62/316,509 filed Mar. 31, 2016 and entitled "PNEUMATIC CONVEYING SYSTEM UTILZING A PRESSURIZED HOPPER WITH INTERMITTENT VOLUMETRIC FEED CONTROL". The subject matter of the above-referenced provisional application is hereby incorporated by reference into the present application in its entirety.

BACKGROUND

Conveying systems dispense material from a hopper to a pressurized convey line through a feed device. Pressure in the convey line can make it difficult to dispense material from the hopper into the convey line. Continuous injection or flow of material to the pressurized convey line limits downtime or interruptions in material delivery. Multiple or redundant systems have been employed to provide continuous material flow to a pressurized convey line. Multiple or redundant systems increase costs and maintenance. The above discussion provides a general introduction and background for the application and is not intended to be used as an aid for determining the scope of the claimed subject matter or invention nor limit the scope of the claimed subject matter.

SUMMARY

The present application relates to a conveying system having multiple phases or control schemes to dispense material from a hopper into a pressurized convey line. The multiple phases or control schemes are implement through a controller assembly or device(s) including circuitry coupled to a pressure valve, fill valve, vent valve and at least one load cell. The circuitry of the controller assembly is configured to open the pressure valve and close the fill and vent valves during a first phase to pressurize the hopper and close the pressure valve and open the fill valve and vent valve during a second phase. The controller assembly includes a feed controller coupled to a feed device and configured to utilize input from the at least one load cell to control a speed of the feed device during the first phase to implement a loss-in-weight feed control scheme and utilize output from a speed or feed rate sensor coupled to the feed device to control the speed of the feed device in the second phase to implement a volumetric flow control scheme. As described, the controller assembly or device provides continuous flow control for a pressurized operating mode and a depressurized operating mode to continuously dispense material to the pressurized convey line.

In illustrated embodiments, the controller assembly utilizes input from the at least one load cell to detect an input weight at or below a threshold weight. Upon detection of the input weight at or below the threshold weight, the controller assembly depressurizes the hopper to fill the hopper and uses input from the speed or feed sensor to control operation of the feed device while the hopper is filled with material. The controller assembly uses input from a clock or the at least one load cell to shift operation from the second phase to the first phase when the hopper is full. Various other features and embodiments of the present application are described herein and application of the claims is not limited to the specific embodiments disclosed.

BRIEF DESCRIPTION OF THE DRAWINGS

The above drawings schematically illustrate embodiments of the present application, however it should be understood that components and features shown are not necessarily drawn to scale and some features are shown schematically.

DETAILED DESCRIPTION OF ILLUSTRATIVE EMBODIMENTS

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1A:
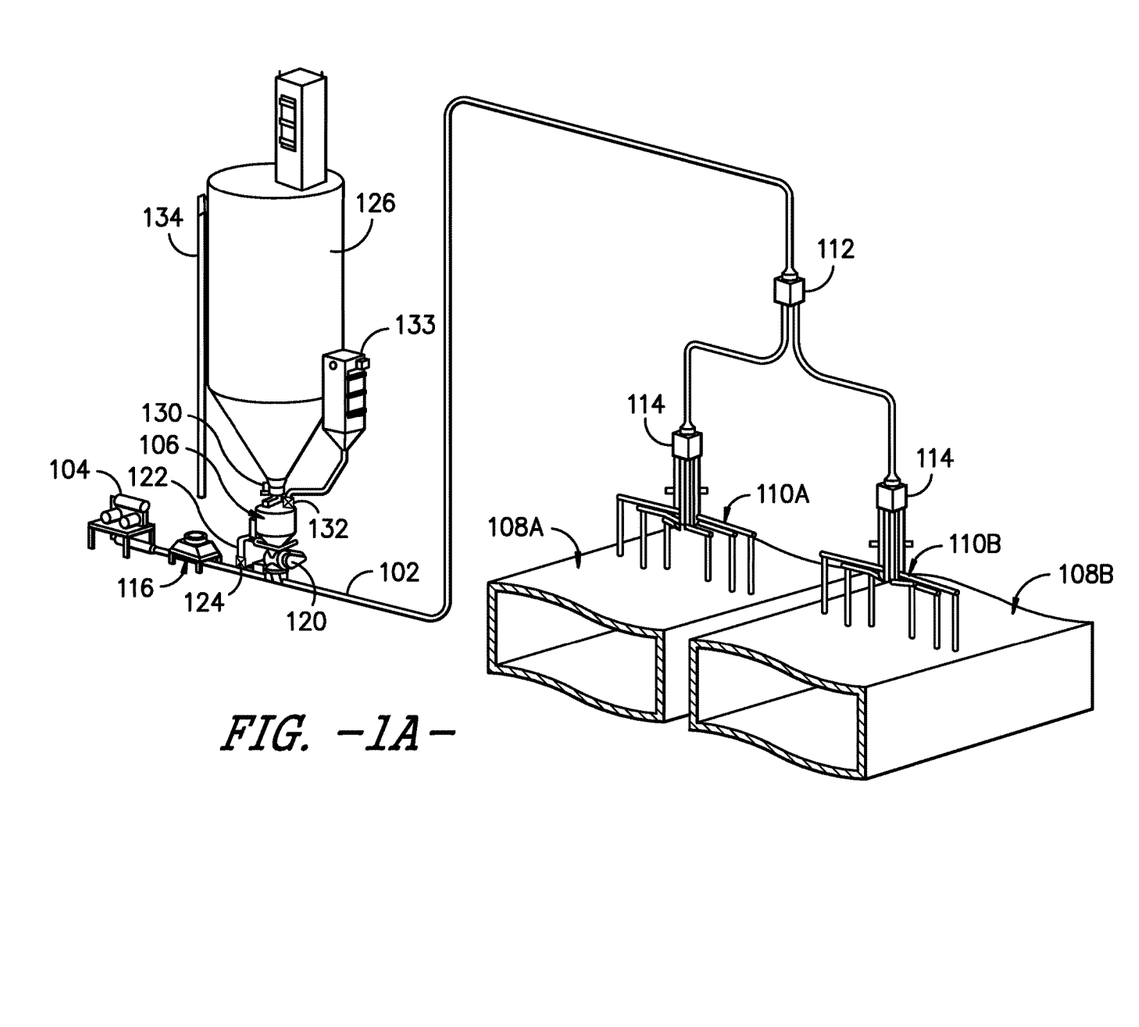
FIG. 1A illustrates an embodiment of a pneumatic conveying system utilizing a pressurized hopper to dispense material to a pneumatic convey line.
Figure 1B:
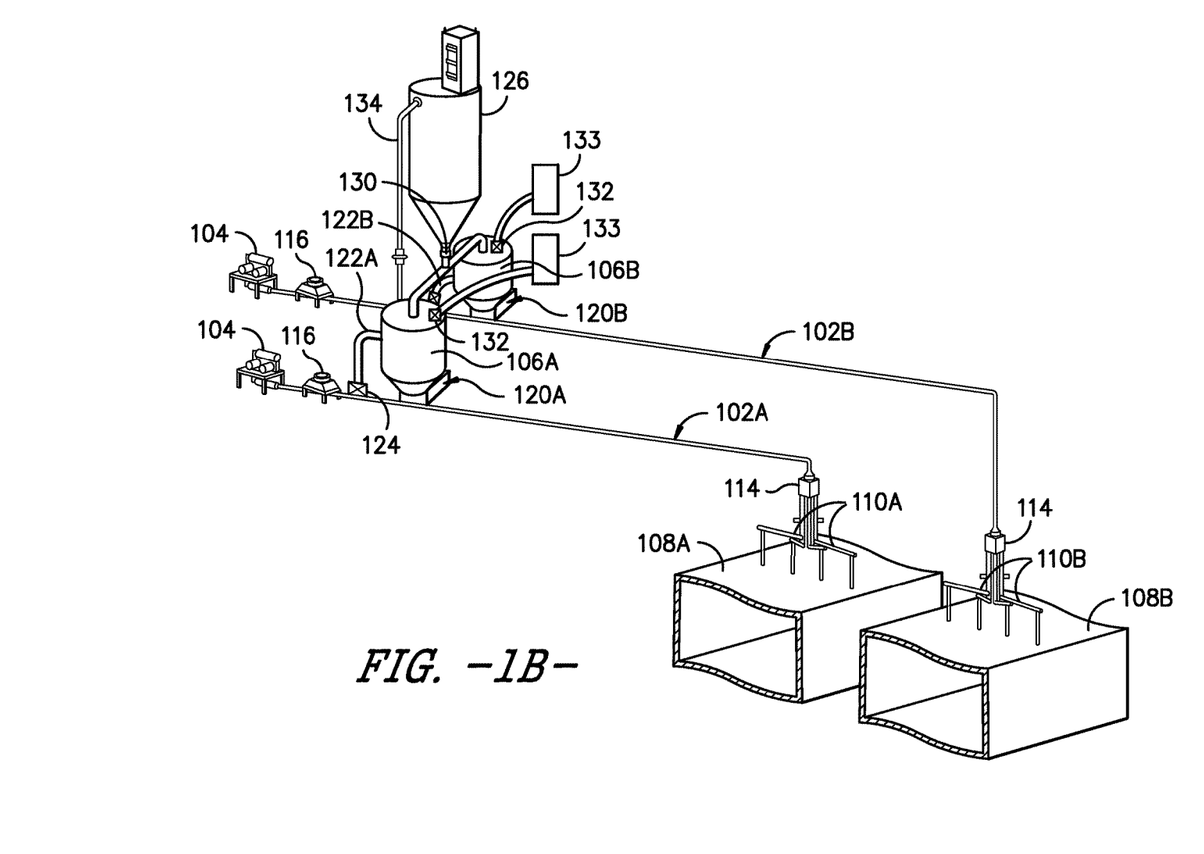
FIG. 1B illustrates another embodiment of a pneumatic conveying system utilizing multiple pressurized hoppers to dispense material to multiple pneumatic convey lines.

The present application relates to a pneumatic conveying system utilizing a pressurized convey line and feed device to dispense material to the pressurized convey line for transport along the convey line. Embodiments of the present system have use for dilute or dense phase pneumatic conveying applications using one or more hoppers and one and more pressurized convey lines as illustrated in FIGS. 1A-1B. In particular, the pneumatic conveying system of the present application as shown in FIGS. 1A-1B has application for pneumatically conveying sorbent materials, such as hydrated lime, for injection into flue gas duct(s) to neutralize pollutants or gases and reduce emissions as shown in FIGS. 1A-1B.

The pneumatic conveying system shown in FIG. 1A includes a convey line or pipe 102 having a pressure source or blower 104 upstream of a hopper 106 to pneumatically transport material dispensed from the hopper 106 along the convey line 102. In the illustrated embodiment, material is dispensed from the hopper 106 to the convey line 102 for injection into flue gas ducts 108A, 108B through injection ports. In the embodiment shown, the material is injected into the ducts 108A, 108B through lances 110A, 110B, however application is not limited to a lance injection system for injecting material from the convey line 102 into ducts 108A, 108B. In embodiment shown, the convey line 102 is connected to lances 110A, 101B through duct splitter 112 and lance splitter 114. In addition to the pressure source or blower 104, a heat exchanger 116 is used to provide temperature controlled pressurized air to the convey line 102 upstream of the hopper 106 as shown in FIG. 1A.

Material is dispensed from the hopper 106 to the convey line 102 through a feed device 120. In the illustrated embodiment, during use, the hopper 106 is pressurized via a pressure line 122 connecting the hopper 106 to the pneumatic convey line 102. In the embodiment described, the feed device is a rotary airlock feed device and the pressure line 122 is connected to the convey line 102 upstream of the rotary airlock feed device 120. Air pressure from the pneumatic convey line 102 is supplied to the hopper 106 through pressure valve 124 (illustrated schematically in FIG. 2A). The pressure valve 124 is operable between an opened position to pressurize the hopper 106 to equalize the pressure across the rotary airlock feed device 120 and a closed position to depressurize the hopper 106 to refill the hopper 106 with material.

As shown, the hopper 106 is filled with material from a silo 126 through gravity feed. A fill valve 130 (illustrated schematically) is operable from a closed position to an open position to open the silo 126 or hopper 106 to fill the hopper with material from the silo 126. While the hopper 106 is filled with material through the open fill valve 130, the pressure valve 124 is closed and a vent valve 132 is opened to depressurize the hopper 106 and vent the hopper 106 to atmosphere. In the illustrated embodiment shown, the hopper 106 is vented to atmosphere through one or more filters 133 to reduce contaminants in the convey line 102. In the embodiment illustrated in FIG. 1A, the silo 126 is connected to a single hopper 106 to pneumatically convey material for injection into flue ducts 108A, 108B. The silo 126 as shown in FIG. 1A is filled from a truck through fill line 134. In an illustrated embodiment, variable frequency drive on the pneumatic blower 104 is adjusted to control air flow and the convey velocity through the convey line 102, although application is not limited to a particular convey velocity control embodiment.

Figure 2A:
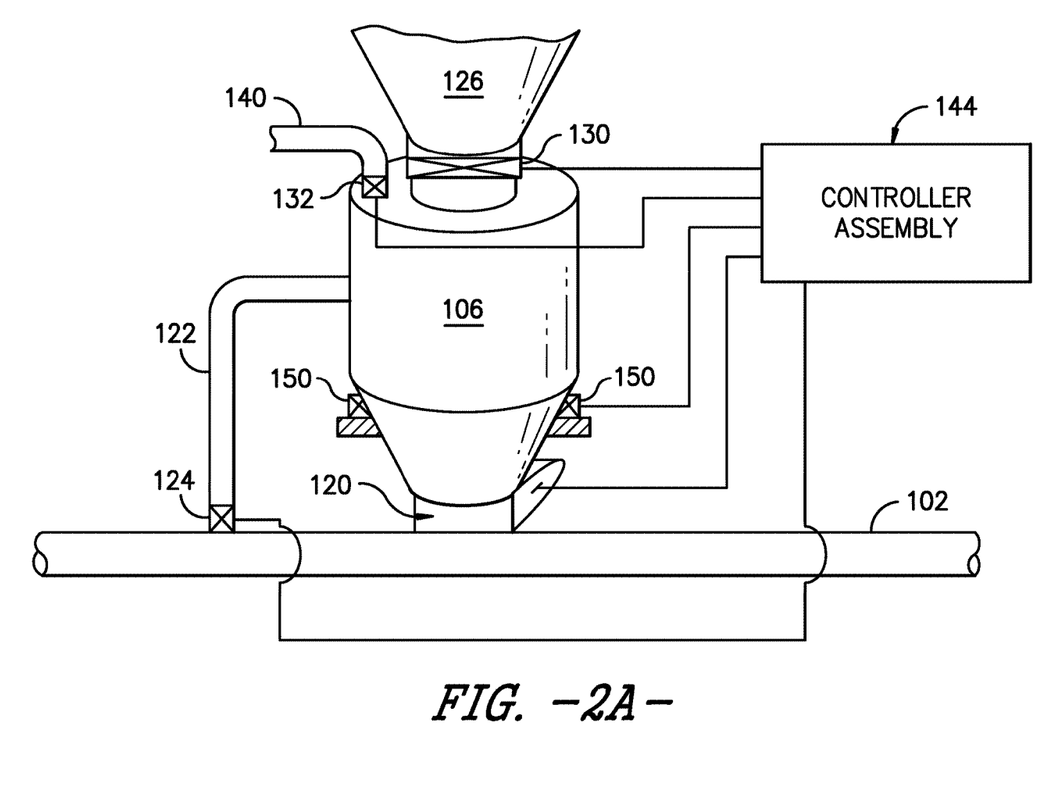
FIG. 2A illustrates an embodiment of a hopper connected to a pressure line through a pressure valve and a controller assembly coupled to the pressure valve to operate the pressure valve to pressurize and depressurize the hopper.

FIG. 1B illustrates an embodiment of a pneumatic conveying system including multiple hoppers 106A, 106B and pneumatic convey lines 102A, 102B to inject material into ducts 108A, 108B. Hoppers 106A and 106B are intermittently filled from a common silo 126 as shown. Each of the hoppers 106A and 106B is connected to a pressure line 122A, 122B to pressurize the hoppers 106A, 106B to equalize the pressure across feed or rotary airlock devices 120A, 120B operable to dispense material from the hoppers 106A, 106B into the respective pneumatic convey lines 102A, 102B. Pressurization of the hoppers 106A, 106B is controlled via pressure valves 124 as shown in FIG. 2A. To fill the hoppers 106A, 106B with material from the silo 126, the pressure valves 124 are closed and respective vent valves 132 are opened to depressurize the hoppers 106A, 106B and vent the hoppers 106A, 106B to atmosphere as previously described.

FIG. 2A is a detailed view of an embodiment of the hopper 106 illustrated in FIGS. 1A and 1B connected to the pneumatic convey line 102 through the feed or rotary air lock device 120. As previously described, the hopper 106 is pressurized through pressure line 122 via operation of the pressure valve 124. During operation, the pressure valve 124 is opened to equalize the pressure across the rotary airlock device 120 to reduce wear and improve product conveyability during operation of the rotary airlock device 120. The hopper 106 is vented through vent line 140 via operation of vent valve 132. Silo 126 is connected to the hopper 106 through fill valve 130 to fill the hopper 106 in the opened position. As shown in FIG. 2A, operation of the rotary airlock device 120, pressure valve 124, fill valve 130 and vent valve 132 is controlled via a controller assembly 144 to coordinate operation and pressurization of the hopper 106 to equalize the pressure across the rotary airlock device 120 and depressurization of the hopper 106 to fill the hopper with material.

Illustratively the controller assembly 144 is a programmable device including one or more hardware components or electronic circuitry. Illustrative circuit elements include a processor(s) and one or more memory devices for storing software or algorithms for synchronizing operation of the feed device 120, pressure valve 124, fill valve 130 and vent valve 132 and algorithms to implement multiple control schemes to control the feed rate of the feed device 120. In an illustrative embodiment, the controller assembly 144 includes a phase controller utilizing a phase control algorithm or circuitry to implement multiple phases including the pressurized phase and the depressurized phase to refill the hopper 106.

As shown in FIG. 2A, one or more load cells 150 are coupled to the hopper 106 to provide a weight measure of material in the hopper 106. The phase controller utilizes feedback or input from the one or more load cells 150 to detect a low fill status. Upon detection of the low fill status, the phase controller closes the pressure valve 124 and opens the fill and vent valves 130, 132 and switches operation from one control phase to another control phase or from a loss-in-weight feed control phase to a volumetric flow or speed control phase implemented through a feed controller. In an illustrative embodiment, the controller assembly 144 includes algorithms or instructions stored on the one or more memory devices and implemented through the processor. Alternatively, the circuitry includes various circuit elements or logic circuitry configured to implement the multiple phase control scheme.

Figure 2B:
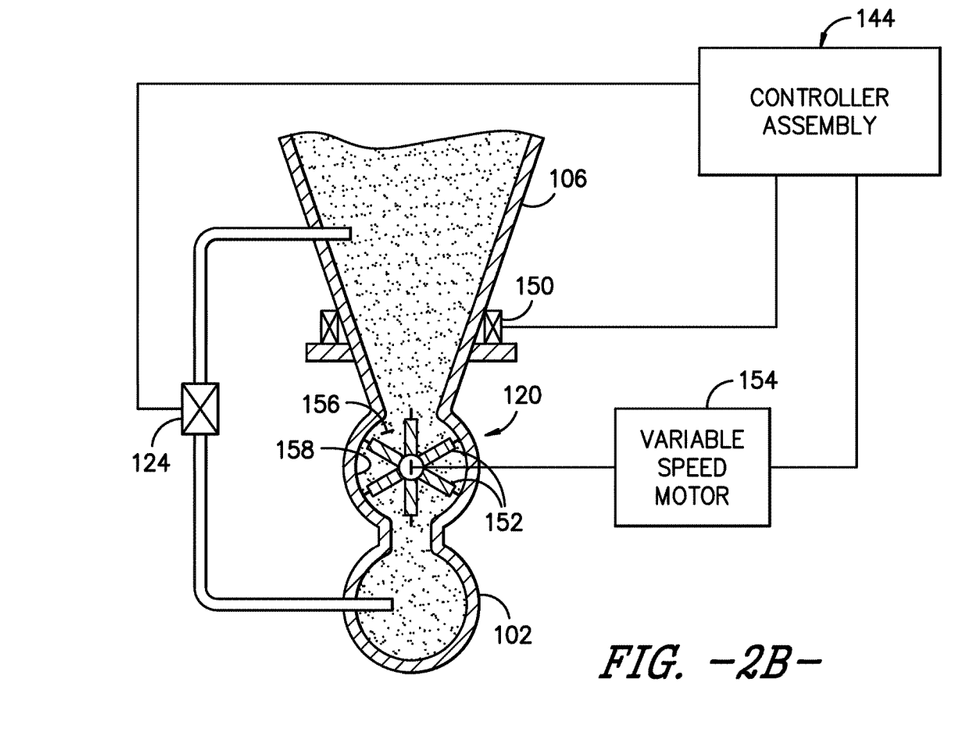
FIG. 2B is a cross-sectional view of a hopper and feed device to dispense material to a convey line also shown in cross-section.

In particular as shown in FIG. 2B, the rotary airlock or feed device 120 includes a plurality of rotating vanes 152. The plurality of vanes 152 are rotated about a rotation axis via operation of a variable speed motor 154 (illustrated diagrammatically) to dispense material into the pneumatic convey line 102. The vanes 152 rotate in chamber 156. The rotary airlock device or feeder 120 can include any number of vanes 152 and application is not limited to the particular number shown. In the illustrated embodiment, the vanes 152 include flaps to reduce clearance between the vanes 152 and the chamber wall 158 to provide an airtight feed device to reduce air leakage from the pressurized convey line 102. To reduce corrosion, the rotating vanes 152 are coated with a corrosive or erosion resistance material to protect from corrosion and erosion.

As shown in Table I, embodiments of the conveying system of the present application implement the pressurized phase at time $t_1$ and depressurized phase at time $t_2$ where $t_2$ is different from time $t_1$ or later in time from time $t_1$. During the pressurized phase, the pressure valve 124 is opened to equalize the pressure across the rotary airlock feeder or device 120 and material is dispensed from the feed device 120 using loss-in-weight feed control algorithms or scheme to control the motor speed or feed rate utilizing feedback or input from one or more load cells 150 (shown schematically in FIGS. 2A-2B). During the depressurized phase, the pressure valve 124 is closed and fill and vent valves 130, 132 (shown in FIG. 2A) are opened and material is dispensed using volumetric feed control algorithms or scheme of the controller assembly 144 to control the speed or feed rate of the feed device 120.

TABLE I

| Pressurized Phase ($t_1$) | Depressurized Phase ($t_2$) |
| --- | --- |
| Pressure valve opened | Pressure valve closed |
| Vent and fill valves closed | Vent and fill valves opened |
| Loss-in weight feed control | Volumetric feed control/speed control |

Figure 3A:
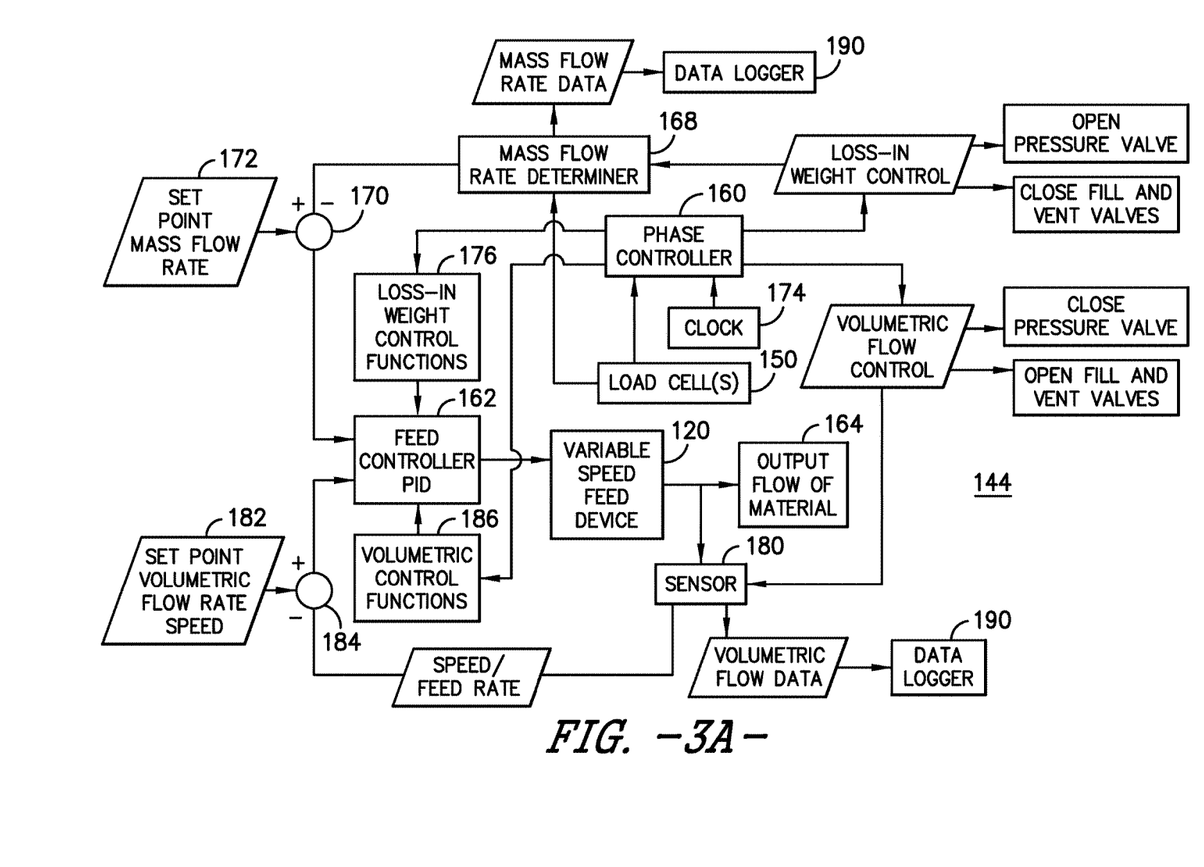
FIG. 3A is a schematic illustration of a controller assembly having a multiple phase control scheme to control output of the pneumatic conveying system utilizing loss-in-weight and volumetric flow control.

FIG. 3A schematically illustrates an embodiment of a controller assembly 144 utilizing loss-in weight feed control and volumetric feed control to continuously dispense material into the pressurized convey line 102 from the hopper 106. The phase controller as illustrated by block 160 is configured to control operating phases or modes utilizing input from the one or more load cells 150 to provide the weight measure of material in the hopper 106 to determine if the hopper 106 needs to be filled. If the input weight from the one or more load cells 150 is above a threshold amount, the phase controller 160 implements the loss-in-weight control scheme and if the weight is below the threshold amount, the phase controller 160 implements the volumetric flow or feed rate control scheme.

During the loss-in-weight control mode, the pressure valve 124 is opened to pressurize the hopper 106 and the fill and vent valves 130, 132 are closed. As shown, the controller assembly 144 also includes feed controller as illustrated by block 162 which utilizes control algorithms or circuit elements to control the motor speed of the feed device 120 to control the output flow rate 164 of material into the convey line 102 to implement the control scheme of Table I. In particular as shown, the controller assembly 144 includes a mass flow rate determiner as illustrated by block 168 which uses input from the one or more load cells 150 to calculate a mass flow rate during the loss-in-weight control mode or phase. The mass flow rate is calculated based upon a differential weight with respect to time ($\Delta W/\Delta t$). The feed controller calculates an offset or error 170 based upon a differential between a set point mass flow rate 172 and the mass flow rate calculated by mass flow rate determiner or circuitry 168.

The feed controller 162 uses the offset or error 170 to generate a control signal or command to increase or decrease the speed of the rotary airlock or feed device 120 response to the offset or error 170 between the set point mass flow rate 172 and the calculated mass flow rate. The mass flow rate determiner 168 includes logic circuitry and/or software configured to determine the mass flow rate with respect to time utilizing input from the one or more load cells 150 at different time intervals and a clock 174. Illustratively the feed controller 162 employs a PID controller which uses loss-in-weight control functions or algorithms 176 to generate the control signal or command to increase or decrease the feed rate or speed to match the output flow rate of material 164 dispensed to the set point mass flow rate 172.

When the phase controller 160 detects that the weight of material in the hopper 106 is below the threshold amount based upon the input weight from the one or more load cells 150, the phase controller 160 shifts operation to the volumetric flow control mode or phase. During the volumetric control mode or phase, the pressure valve 124 is closed and the fill and vent valves 130, 132 are opened to fill the hopper 106 while dispensing material to the convey line 102 using volumetric feed control. In particular for volumetric feed control, an output motor speed from a speed/feed rate sensor 180 is used to provide the speed/feed rate feedback input to generate the control command to control the speed or feed rate of the variable speed motor or feed device 120. As shown, the output motor speed is compared to a set point speed 182 to determine an error or offset 184. Similarly, the offset or error 184 is used by the feed controller 162 to generate the control command to increase or decrease the input speed to the rotary airlock or feed device 120 to control the feed rate based upon volumetric/speed control functions or algorithms 186.

In particular, as described, the feed rate or speed of the motor corresponds to a volumetric quantity of material dispensed per minute (or unit time). The volumetric flow rate for a given motor speed depends upon the density of the material dispensed and is calibrated or learned using flow rate measured during the loss-in-weight feed control mode. In particular, the set point speed for the volumetric feed control mode is determined based upon motor speed and flow rate data measured during the loss-in-weight feed control mode. In an illustrative embodiment, the speed sensor 180 is a tachometer.

As shown, output mass flow rate data from the mass-flow rate determiner 168 and output speed or feed rate data corresponding to output volumetric flow are provided to a data logger or memory device 190 to record the flow rate of material dispensed and/or pneumatically conveyed and injected into the convey line to satisfy compliance requirements. In illustrative embodiments, the phase controller 160 uses an elapsed time or set point fill weight to shift operating modes from the volumetric feed control phase to the loss-in-weight feed control phase. In particular, the phase controller uses input from the clock 174 to detect completion of a preset time or input from the load cell(s) 150 to detect a fill weight to shift between the pressurized loss-in-weight feed control phase or scheme and the depressurized volumetric feed control phase or scheme. In an illustrated embodiment, the volumetric feed control mode time frame is very small compared to the time frame the system operates under loss-in-weight feed control. In particular in an illustrated embodiment the loss-in weight feed control mode is 59 minutes and the volumetric feed control mode is one minute or less.

In illustrated embodiments, the controller assembly 144 includes algorithms and instructions stored on one or more hardware devices such as ROM, RAM and solid state memory devices and the instructions are implemented through one or more processing units or processors. Although the phase and feed controllers are shown separately or as separate components, the functions of the feed and phase controllers and other components of the controller assembly disclosed herein can be implemented through a common controller device or circuit board. In illustrated embodiments, the feed controller 162 uses a proportional integral derivative (PID) control scheme or other feedback control logic to control the motor or feed device rate/speed to maintain the set point mass flow rate 172 for loss-in-weight feed control and the set point volumetric flow rate or motor speed 182 for volumetric feed control.

Figure 3B:
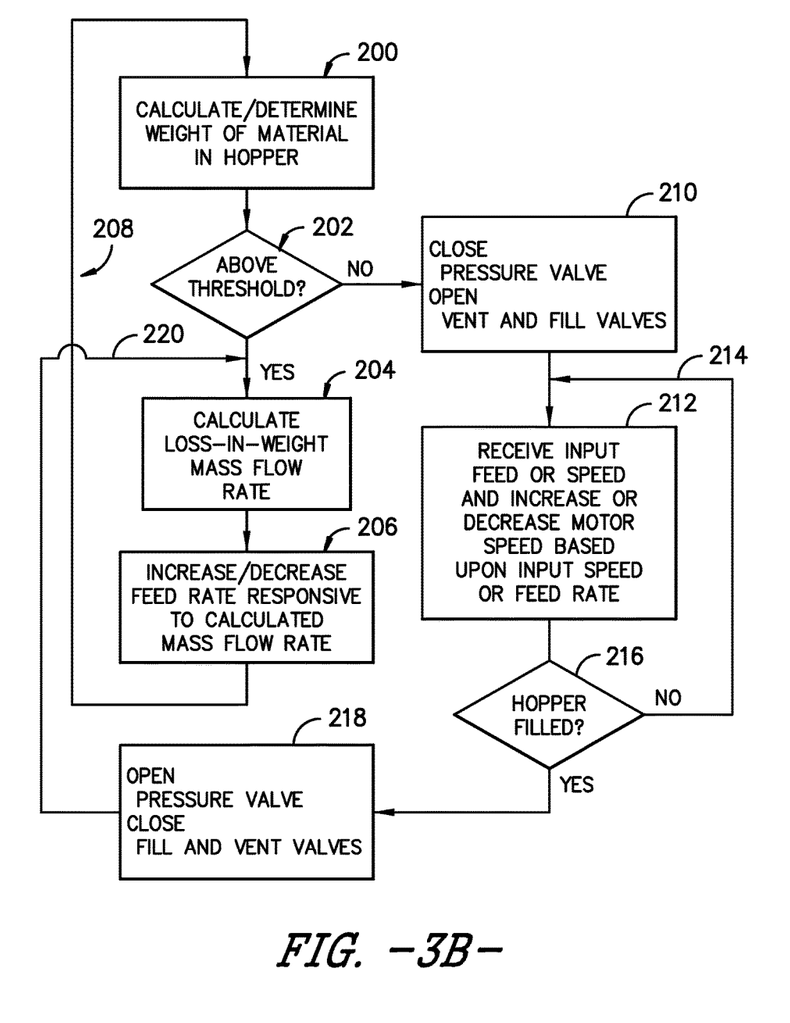
FIG. 3B is a flow chart illustrating an operating sequence for an embodiment of the pneumatic conveying system of the present application.

FIG. 3B is a flow chart illustrating operation of a pneumatic conveying application having a pressurized phase and a depressurized phase as described. As shown in FIG. 3B, the controller assembly 144 processes input from the one or more load cells 150 to determine the weight of material in hopper 106 as illustrated in step 200. If the weight of material in the hopper 106 is above the threshold amount decision in step 202, the input from the one or more load cells 150 is used to determine a mass flow rate corresponding to a change in weight with respect to time (e.g. ΔW/Δt) as shown in step 204. The mass flow rate is compared to the set point mass flow rate 172 and the motor speed or feed rate is increased or decreased in step 206 based upon the differential between the calculated mass flow rate and the set point mass flow rate to control output flow at the set point mass flow rate. As shown by feedback line 208, steps 200-206 are continuously repeated at set time intervals to provide loss-in-weight feed control.

If the weight in the hopper is below the threshold weight in step 202, the pressure valve 124 is closed and the fill and vent valves 130, 132 are opened to fill the hopper 106 as shown in step 210. In step 212, an input motor speed or feed rate is compared to the set point speed or flow rate 182 and the feed rate or speed of the feed device 120 or motor 154 is increased or decreased to control the output volumetric flow rate. Step 212 is repeated as necessary as illustrated by line 214 at set time intervals until the hopper is filled. Upon detection of the fill weight or elapsed time in decision step 216, the fill and vent valves 130, 132 are closed and the pressure valve 124 is opened as illustrated in step 218 and operation shifts as illustrated by line 220 to the loss-in-weight control scheme of steps 204, 208 until the low fill weight is detected in step 202. The decision step 216 can be implemented based upon an elapsed time interval provided by the clock 174 or the fill weight threshold measured by the one or more load cells 150 as previously described.

In illustrated embodiments, the pressure, fill, and vent valves 124, 130, 132 are butterfly valves, pneumatic valves, or electro-magnetic/solenoid valves and application is not limited to a particular valve or actuator construction and illustrative embodiments of the valves can be electrically, pneumatically or hydraulically actuated as appreciated by those skilled in the art. Furthermore, application is not limited to the rotary feed device and other variable speed feed devices such as vibratory feed devices having a variable feed rate can be used.

The system or assembly described provides continuous dispensing via one or more hoppers utilizing a pressurized phase to equalize pressure across a feed device controlled via loss-in-weight feed control to reduce wear and a depressurization phase to refill the hopper while dispensing material under a volumetric control regime. Thus, the system or application described optimizes utilization of the hopper to limit downtime during filling while enhancing feed and reducing wear during operation. Although the present invention has been described with reference to preferred embodiments, workers skilled in the art will recognize that changes may be made in form and detail without departing from the spirit and scope of the invention.

What is claimed is:

1. A controller assembly for dispensing material from a hopper through a feed device comprising:
   electronic circuitry coupled to a pressure valve, a fill valve, a vent valve and at least one load cell and the circuitry including:
   a phase controller connectable to the pressure valve, the fill valve and the vent valve and configured to open the pressure valve and close the fill and vent valves during a first phase to pressurize the hopper during the first phase and to close the pressure valve and open the fill valve and the vent valve during a second phase; and
   a feed controller connectable to the feed device and configured to utilize input from the at least one load cell to provide a control command to the feed device to control a speed of the feed device responsive to the input from the at least one load cell while the pressure valve is opened to pressurize the hopper during the first phase and utilize input from a speed sensor coupled to the feed device to provide the control command to the feed device responsive to the input from the speed sensor while the pressure valve is closed during the second phase.

2. The controller assembly of claim 1 wherein the phase controller is configured to compare the input from the at least one load cell to a threshold weight and if the input from the at least one load cell is at or below the threshold weight the phase controller closes the pressure valve and opens the fill and vent valves to shift from the first phase to the second phase.

3. The controller assembly of claim 1 wherein the circuitry includes a clock and the phase controller compares an elapsed time measurement from the clock to a preset time and if the elapsed time measurement is at or above the preset time, the phase controller is configured to shift operation from the second phase to the first phase, and close the fill and vent valves and open the pressure valve to pressurize the hopper.

4. The controller assembly of claim 1 wherein the phase controller compares the input from the at least one load cell to a set point fill weight and if the input from the at least one load cell is at or above the set point fill weight, the phase controller is configured to close the fill and vent valves and open the pressure valve to shift operation from the second phase to the first phase.

5. The controller assembly of claim 1 wherein the feed device is a rotary air lock device including rotating vanes coupled to a motor to rotate the vanes about a rotation axis and the speed sensor is a tachometer and the feed controller utilizes the input from the tachometer to provide the control command to the motor.

6. The controller assembly of claim 1 wherein the circuitry includes one or more memory devices configured to store the input from the at least one load cell to log a loss-in-weight feed rate during the first phase.

7. The controller assembly of claim 1 wherein the circuitry includes one or more memory devices configured to store the input from the speed sensor to log a volumetric feed rate during the second phase.

8. The controller assembly of claim 1 wherein the feed controller utilizes a programmable set point mass flow rate and compares a mass flow rate calculated from the input from the at least one load cell and a clock to the set point mass flow rate to provide the control command to the feed device.

9. The controller assembly of claim 1 wherein the pressure valve connects the hopper to a pressurized convey line in an open position to pressurize the hopper and the vent valve connects the hopper to atmosphere in an open position to vent the hopper when the pressure valve is closed.

10. An assembly comprising:
a hopper;
a pressure valve operable between an opened position to connect the hopper to a pressure source to pressurize the hopper and a closed position;
a vent valve operable between an opened position to vent the hopper and a closed position;
a fill valve operable between an opened position to fill the hopper with material and a closed position;
a feed device coupled to the hopper and operable to dispense material from the hopper;
at least one load cell coupled to the hopper; and
a controller assembly including circuitry coupled to the feed device, the pressure valve, the vent valve and the fill valve and configured to open the pressure valve to the opened position during a first phase to pressurize the hopper and open the vent valve and fill valve and close the pressure valve in a second phase to depressurize and fill the hopper and the controller assembly is configured to utilize input from the at least one load cell to control the feed device in the first phase while the pressure valve is opened to pressurize the hopper and feedback from a speed sensor coupled to the feed device to control the feed device during the second phase while the pressure valve is closed.

11. The assembly of claim 10 wherein the circuitry includes a clock and one or more memory devices configured to store mass flow rate data determined from the input from the at least one load cell during the first phase and feed rate data determined from the feedback from the speed sensor during the second phase.

12. The assembly of claim 10 wherein the feed device is coupled to a pressurized convey line to dispense material from the hopper into the pressurized convey line and the pressure valve connects the hopper to the pressurized convey line in the opened position to pressurize the hopper.

13. The assembly of claim 10 wherein the feed device is a rotary airlok device including a plurality of vanes rotatable about a rotation axis through a motor and the speed sensor is coupled to the motor to provide the feedback to control a feed rate of the feed device during the second phase.

14. The assembly of claim 10 wherein the controller assembly compares the input from the at least one load cell to a threshold weight and if the input from the at least one load cell is at or below the threshold weight, the controller assembly is configured to close the pressure valve and open the fill and vent valves to shift from the first phase to the second phase.

15. The assembly of claim 10 wherein the circuitry includes a clock and the controller assembly compares one of an elapsed time measurement from the clock to a preset time or the input from the at least one load cell to a set point fill weight and if the elapsed time measurement is at or above the preset time or the input from the at least one load cell is at or above the set point fill weight, the controller assembly closes the fill and vent valves and opens the pressure valve to shift operation from the second phase to the first phase.

16. A method comprising:
opening a pressure valve to pressurize a hopper;
operating a feed device to dispense material from the pressurized hopper into a pressurized convey line while the pressure valve is opened utilizing feedback from at least one load cell to increase or decrease a speed of the feed device utilizing a loss-in-weight feed control scheme during a first phase;
detecting an input weight from the at least one load cell below a threshold weight;
closing the pressure valve and opening a vent valve to vent the hopper;
opening a fill valve to fill the hopper; and
operating the feed device to dispense material from the hopper while the fill valve is opened to fill the hopper and the pressure valve is closed utilizing a volumetric feed rate control scheme during a second phase.

17. The method of claim 16 and following the step of operating the feed device while the fill valve is opened and the pressure valve is closed utilizing the volumetric feed rate control scheme comprising:
closing the fill valve;
opening the pressure valve to pressurize the hopper; and
operating the feed device while the pressure valve is opened utilizing the feedback from the at least one load cell to control the speed of the feed device utilizing the loss-in-weight feed control scheme.

18. The method of claim 16 wherein the pressure valve connects the hopper to the pressurized convey line upstream of the feed device and the step of opening the pressure valve connects the hopper to the pressurized convey line to supply convey line pressure to the hopper during the first phase.

19. The method of claim 16 and comprising the steps of comparing an elapsed time to a preset time or comparing the input weight to a set point fill weight and upon detection of either the elapsed time at or above the preset time or the input weight at or above the set point fill weight, closing the fill valve and the vent valve and opening the pressure valve to pressurize the hopper and operating the feed device utilizing the loss-in-weight feed control scheme.

20. The method of claim 16 and comprising the step of logging mass flow rate data during the first phase and volumetric feed rate data during the second phase.

* * * * *